C. L. WEIL.
METHOD OF SEPARATING SOLUBLE BODIES FROM MIXED SOLUTIONS.
APPLICATION FILED JUNE 22, 1917.
1,304,004.
Patented May 20, 1919.
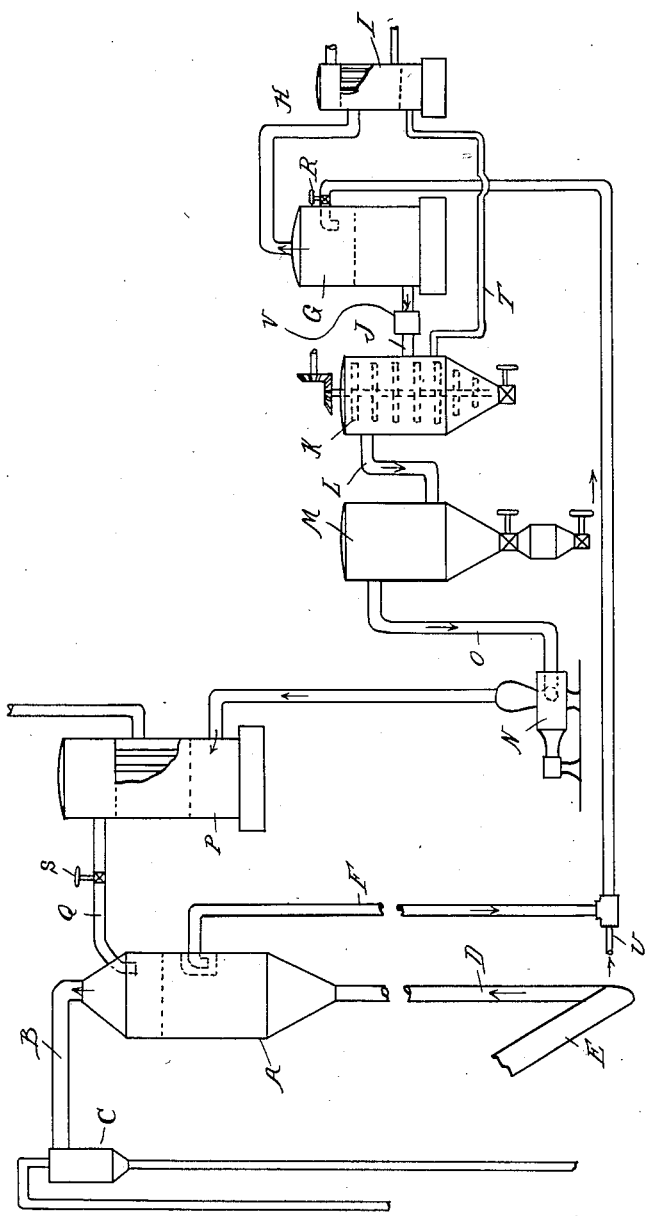
Inventor
Charles L. Weil
By Whittemore Hulbert + Whittemore
Attorneys

UNITED STATES PATENT OFFICE.

CHARLES LEWIS WEIL, OF PORT HURON, MICHIGAN.

METHOD OF SEPARATING SOLUBLE BODIES FROM MIXED SOLUTIONS.

1,304,004.     Specification of Letters Patent.     Patented May 20, 1919.

Application filed June 22, 1917. Serial No. 176,259.

*To all whom it may concern:*

Be it known that I, CHARLES L. WEIL, a citizen of the United States of America, residing at Port Huron, in the county of St. Clair and State of Michigan, have invented certain new and useful Improvements in Methods of Separating Soluble Bodies from Mixed Solutions, of which the following is a specification, reference being had therein to the accompanying drawings.

The invention relates to the art of separating soluble bodies from mixed solutions, and it is the object of the invention to obtain a process by which a plurality of different salts may be continuously separated from the solution. My invention is based on the known principle that certain salts, such for instance as sodium chlorid, vary but slightly in solubility at different temperatures, while the solubility of other salts, such as potassium sulfate, varies with temperature to a considerable degree. Thus with a mixed solution which is saturated at any given temperature, the lowering of the temperature will cause the precipitation of one of the salts to a greater degree while at a higher temperature the solution may be boiled to precipitate the other of the salts without precipitation of the first.

To obtain a simple method of alternating between high and low temperatures for continuous extraction, I have devised a process in which the lowering of the temperature is by reduction in pressure, while the raising of the temperature is through combined pressure and heat. This eliminates the necessity for artificial refrigeration and also conserves the energy required, which is no greater than that which will be necessary for the evaporation of the solution without separation of the salts.

My improved process may be carried out with various forms of apparatus, but in the drawing I have illustrated diagrammatically one construction suitable for the purpose.

As shown, A is a vacuum pan, B is the vapor conduit connected with a condenser C, D is the depending hydrostatic leg and E is an elevator connected therewith,—all of usual construction in vacuum evaporating apparatus. F is a conduit connected with the liquid space in the pan A having a hydrostatic leg of sufficient depth to maintain the vacuum against atmospheric pressure and then extending to a flasher or vacuum pan G. H is the vapor conduit from the flasher G leading to a condenser I. J is a liquid outlet leading to a mixer K which is connected by a conduit L with a settler M. N is a pump in an outlet conduit O from the settler for forcing the liquid through a heater P and thence through a conduit Q to the vacuum pan A. Valves R and S are arranged respectively in the conduits F and Q so that the high pressure may be maintained in one part of the system and low pressure in the other.

With the apparatus just described there is an endless circuit through which the brine or mixed solution can be continuously propelled by the pump N. Assuming that this mixed solution when in the conduit F is substantially saturated at any predetermined temperature,—that is, contains as much of each of two salts, such as sodium chlorid and potassium sulfate, as can be dissolved at this temperature, the operation will be as follows: The liquid upon entering the flasher G will be under reduced pressure, causing the evaporation and the consequent precipitation of a portion of each of the salts. The liquid and precipitated salts are then carried into the mixing chamber K and at the same time a quantity of water is introduced through a conduit T equal to the quantity taken out of the chamber G. This may, if desired, be the condensed vapor, which passes from the chamber G through the conduit H to the condenser I and is then returned through the conduit T to the mixer K. By reason of the evaporation the temperature of the liquid in the chamber G and mixer is reduced which reduces the solubility of one of the precipitated salts, such as the potassium sulfate, without materially altering the solubility of the other salt, such as the sodium chlorid. Consequently the latter salt will be re-dissolved while the former will still remain in suspension and will be carried through the conduit L into the settling chamber M. Here the salt will be separated from the liquid, which latter is then propelled by the pump N through the heater P where it is raised to a higher temperature. The heated liquid is then introduced into the vacuum pan A where it is again flashed at a higher temperature. This temperature is such that evaporation of a portion of the water can take place without attaining the point of saturation of the potassium sulfate or equivalent salt, but the sodium chlorid being in substantial saturation when entering the vacuum pan will be precipitated, descending through the leg D and being removed by the elevator E. The flashing operation will again reduce the temperature of the liquid so that when it passes out through the conduit F it will be at substantially the original temperature and state of concentration but of a diminished volume. The quantity which has been removed is replaced by additional solution entering through a conduit U, which is the same in character as the returned solution and together therewith passes again through the cycle.

It will be understood that with the process just described there will be a continuous precipitation of both salts in the chamber G, the re-dissolving of one of these salts in the chamber K and re-precipitation of the same in the chamber A after the other salt has been removed in the chamber M. As the flow of the fluid through the circuit and the precipitation of the salt progresses constantly the separation will be rapid even where there is but a small percentage of the salt removed from the solution at any one time. It will be understood that while the process has been described as operating under atmospheric and less than atmospheric pressures, it may be modified to operate under any suitable pressure according to the nature of the salts that are separated.

If desired, the pressure in the chamber K may be restored by inserting a pump, indicated at V, in the conduit J between said chamber and the chamber G. It is also to be understood that the apparatus is provided with the necessary means for maintaining the desired difference in pressure in different portions thereof.

What I claim as my invention is:

1. The method of separating soluble bodies from a mixed solution thereof, comprising precipitating quantities of both salts at one point through evaporation and cooling, adding solvent to redissolve one of said salts, removing the undissolved salt from the solution, heating the solution and precipitating the other salt from heated solution by reduction of pressure and consequent evaporation.

2. The method of separating soluble bodies from a mixed solution thereof, comprising the flowing of the solution through an endless circuit precipitating quantities of both salts at one point through evaporation and cooling, adding solvent to redissolve one of said salts, removing the undissolved salt from the solution, heating the solution in another part of the circuit, and precipitating the other salt from the heated solution through reduction of pressure and consequent evaporation.

3. The method of separating soluble bodies from mixed solutions, comprising precipitating quantities of both salts through a reduction of temperature effected through evaporation induced by reduction of pressure, adding solvent to redissolve one of said salts, removing the undissolved salt from the solution, heating the solution and precipitating the other salt from the heated solution by reduction of pressure and consequent evaporation.

4. The method of separating soluble bodies from mixed solutions, comprising the flowing of the solution through an endless circuit, precipitating quantities of both salts at one point of said circuit through a reduction of temperature effected through an evaporation induced by reduction of pressure, adding solvent to redissolve one of said salts, removing the undissolved salt from the solution, heating the solution in another part of the circuit and precipitating the other salt from the heated solution by reduction of pressure and consequent evaporation.

In testimony whereof I affix my signature.

CHARLES LEWIS WEIL.